United States Patent Office 3,067,229
Patented Dec. 4, 1962

3,067,229
PHOSPHORUS CONTAINING ORGANOSILICON
COMPOUNDS
Frank Fekete, Monroeville, Pa., assignor to Union
Carbide Corporation, a corporation of New York
No Drawing. Filed Aug. 2, 1960, Ser. No. 50,879
17 Claims. (Cl. 260—448.2)

This invention relates to novel organosilicon compounds, both silanes and siloxanes, which contain phosphorus bonded to silicon through a divalent hydrocarbon group.

This application is a continuation-in-part of co-pending applications Serial Nos. 782,364, 782,380, and 782,381, all filed December 23, 1958, all now abandoned.

My novel silanes are represented by the general formulas:

(I) 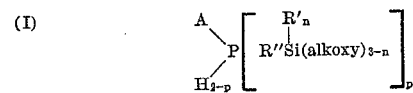

and (II) 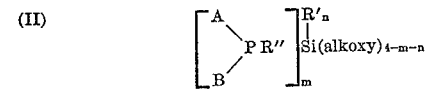

wherein R' is a hydrocarbyl group, e.g., methyl, ethyl, propyl, butyl, vinyl, allyl, oleyl, cyclohexyl, cyclopentyl, cyclohexenyl, cyclopentenyl, phenyl, tolyl, naphthyl, phenyl ethyl, and the like; A is a hydrocarbyl group, i.e., R', or hydrocarbyloxy, i.e., R'O, where R' is defined and illustrated above, B is the hydrocarbyloxy group, i.e., R'O, an alkenyl group, e.g., vinyl, allyl and the like, a cycloalkenyl or cycloalkyl group, e.g., cyclopentenyl, cyclohexenyl, cyclopentyl, cyclohexyl, cycloheptyl and the like, or an aryl, alkaryl or aralkyl group, e.g., phenyl, tolyl, naphthyl, p-ethylphenyl, phenylethyl, benzyl and the like, R'' is a divalent hydrocarbon group free of aliphatic unsaturation, e.g., methylene, —CH$_2$—, ethylene, —CH$_2$CH$_2$—, propylene,

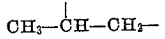

trimethylene, —CH$_2$CH$_2$CH$_2$—, octadecamethylene,

—(CH$_2$)$_{18}$— phenylene, —C$_6$H$_4$—, cyclohexylene, —C$_6$H$_{10}$—, tolylene, CH$_3$C H$_3$=, naphthylene, C$_{10}$H$_6$=, phenylene-dimethylene, —CH$_2$C$_6$H$_4$CH$_2$—, phenylethylene,

and the like, p is an integer of 1 to 2, m is an integer of 1 to 2, n is an integer of 0 to 2 and n+m is an integer of 1 to 3. By the term "hydrocarbyl" as employed herein, is meant a monovalent hydrocarbon group, i.e., a group composed of carbon and hydrogen. Thus hydrocarbyloxy designates a monovalent hydrocarbon group attached to ether oxygen, i.e., R'O— where R' is as defined above. My preferred silanes are those in which A, B, R'' and R' each individually contain from one to eighteen carbon atoms and the alkoxy group, i.e., (alkoxy), contains one to six carbon atoms.

Illustrative of the novel silanes represented by Formula I are (phenylphosphinoethyl)triethoxysilane,
H(C$_6$H$_5$)P(CH$_2$)$_2$Si(OC$_2$H$_5$)$_3$,
bis(triethoxysilylethyl)phenylphosphine,
C$_6$H$_5$P[(CH$_2$)$_2$Si(OC$_2$H$_5$)$_3$]$_2$,
(methylphosphinostearyl)methyldiethoxysilane,
CH$_3$P(CH$_2$)$_{18}$Si(CH$_3$)(OC$_2$H$_5$)$_2$,
bis(diethoxyphenylsilylstearyl)methylphosphine,
CH$_3$P[(CH$_2$)$_{18}$Si(CH$_3$)(OC$_2$H$_5$)$_2$]$_2$,
(stearylphosphinocyclohexyl)ditolylpropoxysilane,
H(C$_{18}$H$_{37}$)PC$_6$H$_{10}$Si(C$_6$H$_4$CH$_3$)$_2$(OC$_3$H$_7$),
bis(propoxyditolylsilylcyclohexyl)stearylphosphine,
C$_{18}$H$_{37}$P[C$_6$H$_{10}$Si(C$_6$H$_4$CH$_3$)$_2$(OC$_3$)]$_2$,
(oleylphosphinophenyl)vinyldibutoxysilane,
H(C$_{18}$H$_{35}$)PC$_6$H$_4$Si(C$_2$H$_4$)(OC$_4$H$_9$)$_2$,
bis(dibutoxyvinylsilylphenyl)oleylphosphine,
C$_{18}$H$_{35}$P[C$_6$H$_4$Si(C$_2$H$_4$)(OC$_4$H$_9$)$_2$]$_2$,
(cyclohexylphosphinopropyl)triethoxysilane,
H(C$_6$H$_{11}$)P(CH$_2$)$_3$Si(OC$_2$H$_5$)$_3$,
bis(triethoxysilylpropyl)cyclohexylphosphine,
C$_6$H$_{11}$P[(CH$_2$)$_3$Si(OC$_2$H$_5$)$_3$]$_2$,
(phenoxyphosphinopropyl)triethoxysilane,
H(C$_6$H$_5$O)PC$_3$H$_6$Si(OC$_2$H$_5$)$_3$,
phenyl bis(triethoxysilylpropyl)phosphinite,
(C$_6$H$_5$O)P[C$_3$H$_6$Si(OC$_2$H$_5$)$_3$]$_2$,
(ethoxyphosphinophenyl)methyldiethoxysilane,
H(C$_2$H$_5$O)PC$_6$H$_4$Si(CH$_3$)(OC$_2$H$_5$)$_2$,
ethyl bis(diethoxymethylsilylphenyl)phosphinite,
(C$_2$H$_5$O)P[C$_6$H$_4$Si(CH$_3$)(OC$_2$H$_5$)$_2$]$_2$,
(octyloxyphosphinostearyl)diphenylethoxysilane,
H(C$_8$H$_{17}$O)PC$_{18}$H$_{36}$Si(C$_6$H$_5$)$_2$(OC$_2$H$_5$),
octyl bis(ethoxydiphenylsilylstearyl)phosphinite,
(C$_8$H$_{17}$O)P[C$_{18}$H$_{36}$Si(C$_6$H$_5$)$_2$(OC$_2$H$_5$)]$_2$, and the like.

Illustrative of the novel silanes represented by Formula II are (butylphenylphosphinoethyl)triethoxysilane,
(C$_6$H$_5$)(C$_4$H$_9$)P(CH$_2$)$_2$Si(OEt)$_3$,
(diphenylphosphinoethyl)methyldiethoxysilane,
(C$_6$H$_5$)$_2$P(CH$_2$)$_2$Si(CH$_3$)(OEt)$_2$,
(phenylethylphosphinopropyl)triethoxysilane,
(C$_6$H$_5$)(C$_2$H$_5$P(CH$_2$)$_3$Si(OEt)$_3$,
(diphenylphosphinopropyl)triethoxysilane,
(C$_6$H$_5$)$_2$P(CH$_2$)$_3$Si(OEt)$_3$,
(diphenylphosphinopropyl)methyldiethoxysilane,
(C$_6$H$_5$)$_2$P(CH$_2$)$_3$Si(CH$_3$)(OEt)$_2$,
(diphenylphosphinopropyl)ethyldipropoxysilane,
(C$_6$H$_5$)$_2$P(CH$_2$)$_3$Si(C$_2$H$_5$)(OC$_3$H$_7$)$_2$,
(diphenylphosphinopropyl)dimethylbutoxysilane,
(C$_6$H$_5$)$_2$P(CH$_2$)$_3$Si(CH$_3$)$_2$(OC$_4$H$_9$),
(diphenylphosphinopropyl)phenylmethylethoxysilane,
(C$_6$H$_5$)$_2$(CH$_2$)$_3$Si(C$_6$H$_5$)(CH$_3$(OC$_2$H$_5$),
(dimethoxyphosphinopropyl)phenyldibutoxysilane,
(CH$_3$O)$_2$P(CH$_2$)$_3$Si(C$_6$H$_5$)(OC$_4$H$_9$)$_2$,
(stearylphenylphosphinopropyl)methyldiethoxysilane,
(C$_{18}$H$_{37}$)(C$_6$H$_5$)P(CH$_2$)$_3$Si(CH$_3$)(OC$_2$H$_5$)$_2$,
(stearoxyphenylphosphinopropyl)methyldiethoxysilane,
(C$_{18}$H$_{37}$O)(C$_6$H$_5$)P(CH$_2$)$_3$Si(CH$_3$)(OC$_2$H$_5$)$_2$,
(phenylethylphosphinocyclohexyl)triethoxysilane,
(C$_6$H$_5$)(C$_2$H$_5$)P(C$_6$H$_{10}$)Si(OC$_2$H$_5$)$_3$,
(cyclohexylphenylphosphinopropyl)methyldiethoxysilane,
(C$_6$H$_{11}$)(C$_6$H$_5$)P(CH$_2$)$_3$Si(CH$_3$(OC$_2$H$_5$)$_2$,
(diphenylphosphinostearyl)triethoxysilane,
(C$_6$H$_5$)$_2$P(CH$_2$)$_{18}$Si(OC$_2$H$_5$)$_3$,
(phenylethylphosphinophenyl)methyldiethoxysilane,
(C$_6$H$_5$)(C$_2$H$_5$)P—C$_6$H$_4$—Si(CH$_3$(OC$_2$H$_5$)$_2$,
(butylcyclohexylphosphinopropyl)vinyldibutoxysilane,
(C$_4$H$_9$)(C$_6$H$_{11}$)P(CH$_2$)$_3$Si(C$_2$H$_3$)(OC$_4$H$_9$)$_2$,
(diphenoxyphosphinopropyl)tripropoxysilane,
(C$_6$H$_5$O)$_2$P(CH$_2$)$_3$Si(OC$_3$H$_7$)$_3$,
(phenylethylphosphinopropyl)cyclohexyldiethoxysilane,
(C$_6$H$_5$)(C$_2$H$_5$)P(CH$_2$)$_3$Si(C$_6$H$_{11}$)(OC$_2$H$_5$)$_2$, and the like.

The novel silanes of Formula I are conveniently made by a process involving the reaction of a phosphorus compound, e.g., phosphines, or phosphinites, having two hydrogen atoms bonded to phosphorus and one hydrocarbyl group. i.e., R', or one hydrocarbyloxy group, i.e., R'O where R' is as previously defined, attached to phosphorus, with an organosilane having one halohydrocarbyl group, i.e., XR''— where R'' is as previously defined, and X is a halogen atom, e.g., chloro, bromo and iodo, bonded to silicon and at least one alkoxy group bonded to silicon, each remaining unfilled valence of silicon being satisfied by a hydrocarbyl group, i.e., R', or an alkoxy group. The phosphine or phosphinite starting materials in this process are presented by the formula:

$$APH_2$$

wherein A is as previously defined. Illustrative phosphines and phosphinites are phenylphosphine, cyclohexylphosphine, isoamylphosphine, benzylphosphine, 2,4,5-trimethylphenylphosphine, methylphosphine, ethylphosphine, cyclohexylphosphine, iso-propylphosphine, propylphosphine, butylphosphine, stearylphosphine, (iso-butyl)-phosphine, oleylphosphine, 4-methylphenylphosphine, 2-methylphenylphosphine, naphthylphosphine, phenyl phosphinite, $(C_6H_5O)PH_2$, ethyl phosphinite, $$(C_4H_5O)PH_2$$

octyl phosphinite, $(C_8H_{17}O)PH_2$, butyl phosphinite, $(C_4H_9O)PH_2$ and the like. Phosphorus compounds also useful as starting materials in the process for preparing silanes of Formula I are the alkali metal salts of the above-described phosphines and phosphinites. These alkali salts are represented by the formulas:

$$APHM \text{ and } APM_2$$

where A is as previously defined and illustrated, and M is an alkali metal, e.g., sodium, potassium, lithium and cesium. Examples of these salts of phosphines and phosphinites are $(4-CH_3C_6H_4)PHNa$, $(4-CH_3C_6H_4)PNa_2$, (naphthyl)PHNa, (naphthyl)PNa$_2$, $(C_6H_5)PHNa$, $$(C_6H_5)PNa_2,$$

$(CH_3)PHNa$, $(CH_3)PNa_2$, $(C_{18}H_{37})PHNa$, $$(C_{18}H_{37})PNa_2$$

$(C_{18}H_{35})PNa_2$, $(C_{18}H_{35})PNa_2$, $(C_6H_{11})PHNa$
$(C_6H_{11})PNa_2$, $(C_2H_5O)PHNa$, $(C_2H_5O)PNa_2$, $$(C_6H_5O)PHNa$$

$(C_6H_5O)PNa_2$, $(C_6H_{11}O)PHNa$, $(C_6H_{11}O)PNa_2$, $$(C_{18}H_{35}O) PHK$$

$(C_{18}H_{35}O)PLi_2$, $(C_{18}H_{37}O)PHLi$, $(C_{18}H_{37}O)PK_2$, and the like.

The novel silanes of Formula II are conveniently made by a similar process involving the reaction of a phosphorus compound, e.g., phosphines, phosphonites and phosphinites having one hydrogen atom bonded to phosphorus and two hydrocarbyl groups, i.e., R', or two hydrocarbyloxy groups, i.e., R'O where R' is as previously defined, or one hydrocarbyl group and one hydrocarbyloxy group as defined above, attached to phosphorus with an organosilane having one to two halohydrocarbyl groups, i.e., XR''— where R'' is as previously defined and X is a halogen atom, e.g., chloro, bromo and iodo, bonded to silicon and at least one alkoxy group bonded to silicon, the remaining unfilled valences of silicon being satisfied by a hydrocarbylgroup, i.e., R', or an alkoxy group. The phosphine, phosphonite and phosphinite starting materials in this process are represented by the formula:

$$\begin{matrix} A \\ \diagdown \\ & PH \\ \diagup \\ B \end{matrix}$$

wherein A and B are as previously defined. Illustrative phosphines, phosphonites, and phosphinites are diphenylphosphine, dicyclohexylphosphine, p-ethylphenylisoamylphosphine, dibenzylphosphine, benzylethylphosphine, di-2,4,5-trimethylphenylphosphine, phenylethylphosphine, phenylmethylphosphine, phenylbutylphosphine, phenylpropylphosphine, phenylbenzylphosphine, phenylcyclohexylphosphine, butylbenzylphosphine, di-2-methylphenyl-phosphine, di-2-ethylphenylphosphine, benzylpropylphosphine, stearylphenylphosphine, butylcyclohexylphosphine, phenylethylphosphonite, benzylmethylphosphonite, diphenylphosphonite, dibenzyl phosphonite, diallyl phosphonite, dicyclohexyl phosphonite, p-ethylphenylstearyl phosphonite, di-2-methylphenyl phosphonite, phenylethyl phosphonite, phenylbutyl phosphonite, phenylstearyl phosphonite, phenylbenzyl phosphonite, cumyl cyclohexyl phosphonite, butyl cyclohexyl phosphonite, phenyl octyl phosphonite, benzylmethyl phosphinite, p-ethylphenylbutyl phosphinite, phenylethyl phosphinite, actylphenyl phosphinite, stearylphenyl phosphinite, phenylstearyl phosphinite, propylphenyl phosphinite, allylphenyl phosphinite, phenylallyl phosphinite, butylbenzyl phosphinite, butylisoamyl phosphinite, ethyl-2-methylphenyl phosphinite, ethylnaphthyl phosphinite, cyclohexylphenyl phosphinite, phenylcyclohexyl phosphinite, and the like.

Phosphorus compounds also useful as starting materials in the process for preparing silanes of Formula II are the alkali metal salts of the phosphines, phosphonites and phospinites described in the next preceding paragraph. These alkali metal salts are represented by the formula:

$$\begin{matrix} A \\ \diagdown \\ & PM \\ \diagup \\ B \end{matrix}$$

where A and B are as previously defined and M is an alkali metal, e.g., sodium potassium, lithium and cesium. Examples of these salts of phosphines, phosphinites and phosphonites are $(C_6H_5)_2PNa$, $(4-CH_3C_6H_4)_2PNa$, $$(2-CH_3C_6H_4)_2PNa$$

(naphthyl)$_2$PNa, $(C_2H_5)(C_6H_5)PNa$, $$(C_3H_7)(C_6H_5)PNa$$

$(C_4H_9)(C_6H_5)PNa$, $(C_6H_5)$, (benzyl)PNa, (cyclohexyl)$_2$PNa, (stearyl)$_2$PNa, and the corresponding K, Cs and Li salts. $(C_2H_5)_2PK$ $(C_2H_5O)(CH_3O)PK$, $(C_2H_5O)(C_3H_7O)PK$, $(C_2H_5O)(C_4H_9O)PK$, $$(C_6H_5O)_2PK$$

$(C_6H_5O)$, $(C_2H_5O)PK$, $(C_6H_{11}O)_2PK$, $$(C_6H_{11}O)(C_6H_5O)PK$$

$(C_{18}H_{35}O)_2PK$, $(C_6H_5O)(C_{18}H_{35}O)PK$ and also the corresponding Cs, Na and Li salts. $(C_2H_5)(C_6H_5O)PLi$, $(C_3H_7)(C_6H_5O)PLi$, $(C_4H_9)(C_6H_5O)PLi$, $$(C_6H_5)(C_2H_5O)PLi$$

$(C_6H_5)(C_4H_9O)PLi$, $(C_6H_5)(C_6H_{11}O)PLi$, $$(C_6H_5O)(C_{18}H_{37})PLi$$

$(C_2H_5)(C_2H_5O)PLi$, $(C_8H_{17}O)(C_6H_5)PLi$, $(C_3H_7)(C_3H_7O)PLi$, $(C_6H_5)(C_6H_5O)PLi$ and the corresponding Cs, K and Na salts.

Preferred phosphines, phosponites, phosphinites and the alkali metal salts of phosphines, phosphonites, and phosphinites employed as starting materials for producing silanes of Formulas I and II are those defined above wherein the A and B groups contain from one to eighteen carbon atoms.

The nomenclature employed herein to designate phosphorus compounds is in accordance with the rules for naming compounds containing one phosphorus atom as approved by the general nomenclature committee of the Organic Division of the American Chemical Society and as published in Chemical and Engineering news, volume 30, No. 43, pages 4515 through 4522, (October 27, 1952).

Organosilanes employed as starting materials in the process for preparing silanes of Formula I are represented by the formula:

$$\underset{\underset{XR''Si(alkoxy)_{3-n}}{|}}{R'_n}$$

wherein R", X, n and "alkoxy" are as previously defined and illustrated and R' is as previously defined and illustrated and need not be the same throughout the same molecule. Typical organosilanes are chloropropyltrimethoxysilane,
chloropropyltriethoxysilane,
chlorophenyldimethylethoxysilane,
chlorocyclohexylphenyldibutoxsilane,
chlorostearyltripropoxysilane,
chlorobutyldiethylmethoxysilane,
chlorocyclopentylallyldipropoxysilane,
chloromethyldicyclohexylbutoxysilane,
bromonaphthylmethyldiethoxysilane,
chloroethyltriethoxysilane,
chlorostearylmethyldiethoxysilane,
chlorocyclohexylditolylpropoxysilane,
chlorophenylvinyldibutoxysilane,
chlorophenylmethyldiethoxysilane,
chlorostearyldiphenylethoxysilane, and the like. Preferred organosilanes employed as starting materials are those as defined above wherein the hydrocarbyl group, R', and the divalent hydrocarbon group, R", each have from one to eighteen carbon atoms.

The process for preparing silanes of Formula I involves the metathesis reaction shown by the equation:

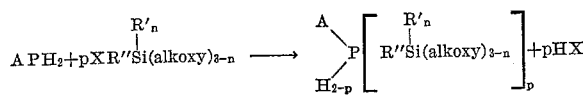

wherein R', R", A, X, p and n are as previously defined and HX is hydrogen halide. When a phosphine, or phosphinite alkali metal salt is employed as the starting phosphorus compound an alkali metal halide, MX where M and X are as previously defined, is formed instead of hydrogen halide in addition to the phosphorus-silicon product.

Organosilanes employed as starting materials in this process for preparing silanes of Formula II are represented by the formula:

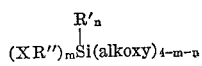

wherein R", X, m, n and "alkoxy" are as previously defined and illustrated and R' is as previously defined and illustrated and need not be the same throughout the same molecule. Typical organosilanes are chloropropyltriethoxysilane,
chlorophenyldimethylethoxysilane,
chlorocyclohexylphenyldibutoxysilane,
chlorostearyltripropoxysilane,
chlorobutyldiethylmethoxysilane,
chlorocyclopentylallyldipropoxysilane,
chloromethyldicyclohexylbutoxysilane,
bromonaphthylmethyldiethoxysilane,
chloroethyltriethoxysilane,
chloroethylmethyldiethoxysilane,
chloropropylmethyldiethoxysilane,
chloropropylethyldipropoxysilane,
chloropropyldimethylbutoxysilane,
chloropropylphenylmethylethoxysilane,
chloropropylphenyldibutoxysilane,
chlorocyclohexyltriethoxysilane,
chlorostearyltriethoxysilane,
bromophenyltriethoxysilane,
bromophenylmethyldiethoxysilane,
chloropropylvinyldibutoxysilane,
chloropropyltripropoxsilane,
chloropropylcyclodiethoxysilane, and the like. Preferred organosilanes employed as starting materials are those as defined above wherein the hydrocarbyl group, R', and the divalent hydrocarbon group, R", each have from one to eighteen carbon atoms.

The process involves the metathesis reaction shown by the equation:

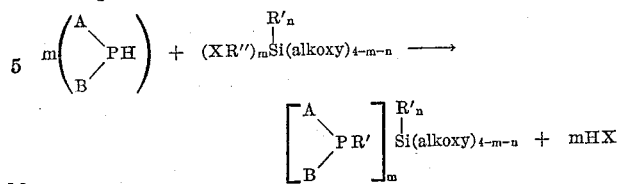

wherein R', R", A, B, X, m, n and m+n are as previously defined and HX is hydrogen halide. When a phosphine, phosphonite or phosphinite alkali metal salt is employed as the starting phosphorus compound, an alkali metal halide, MX where M and X are as previously defined, is formed instead of hydrogen halide in addition to the phosphorus-silicon product.

The process for preparing the silanes of Formula I or Formula II is carried out by bringing organosilane and the phosphorus compound into reactive contact and continuously removing from the reaction zone the hydrogen or metal halide as it is formed in the reaction. Mole ratios of phosphorus compound and organosilane employed in the reaction are not narrowly critical. Stoichiometric amounts are preferred for efficient reaction and ease of product recovery. For example, one mole of phosphorus-bonded hydrogen or alkali metal is preferred for each mole of halogen, bonded through hydrocarbon to silicon, desired to be displaced. Other than stoichiometric amounts of starting materials can also be used. The temperature of the reaction is not narrowly critical and can be varied in accordance with the speed of reaction desired. Temperatures of 75° C. to 300° C. are advantageous in providing a smooth reaction and high yields of products. Temperatures below 75° C. can be employed if desired but the reaction rate is slowed. Temperatures above 300° C. can also be employed but the likelihood of reduced yields is greater. My process is advantageously carried out at atmospheric pressure or at whatever pressures exist in the particular reaction vessel employed without purposely applying increased or reduced pressures. Subatmospheric or superatmospheric pressures can be employed, however, if desired. Where one or more of the starting materials are gaseous at the chosen reaction temperature, superatmospheric pressure and a closed reaction vessel are conveniently employed to bring the starting materials into reactive contact. No catalysts are required although suitable catalysts such as tetramethyl ammonium chloride, trimethylbenzyl ammonium chloride and the like, can be employed for whatever advantage they may provide. Solvents also are not required but are useful in simplifying the handling of the reaction mixture. If a solvent is employed, xylene, toluene, benzene, methylethyl ketone, dimethyl formamide and the like, are recommended. A solvent which dissolves the starting materials and the products but does not dissolve formed hydrogen or alkali metal halide, as continuously removed from the reaction zone by any suitable technique of which many are known. The formed alkali metal halides are most effectively removed by precipitation which can be assured by employing a solvent as listed above which dissolves the silicon compound and phosphorus compound starting materials and the phosphorus-silicon product but does not dissolve the formed alkali metal halide. A particularly suitable technique for removing formed hydrogen halide is to employ a hydrogen halide acceptor, such as the tertiary amines, added to the reaction mixture in the approximate stoichiometric amounts based on the amount of hydrogen halide expected to be formed in the reaction. Triethyl amine, pyridine, tributyl amine, and the like, are some of the excellent hydrogen halide acceptors. Excess amounts of the acceptor over and above the stoichiometric amount is preferably employed to ensure the substantially complete removal of the hydrogen halide. Primary amines, secondary amines and ammonia can also be employed in controlled amounts as hydrogen halide acceptors. For example, the primary and secondary amines and ammonia can be continuously or intermittently added (e.g., by titration) as the reaction proceeds in such quantities that maintain the reaction mixture slightly acidic to slightly basic. The hydrogen halide can even be continuously stripped by boiling it from the reaction mixture as it is formed employing techniques within the chemist's skill. Although it is not necessary in order to obtain a product, it is preferable, no matter what particular technique is employed in removing hydrogen halide, to maintain the pH of the system above about 6 to prevent decreased yields due to possible side reactions involving the formed hydrogen halide, and below about 8 when strongly basic acceptors or other materials are employed to prevent possible side reactions involving the silicon compound in the event moisture is also present.

The product is isolated by any suitable procedure many of which are commonly employed by persons skilled in the art. For example, the distillable products, i.e., in general the silanes, are most readily isolated and purified by fractional distillation. The high boiling products, i.e., in general the siloxanes, are most readily isolated by removing foreign material, e.g., unreacted starting materials and by-products, by distillation, washing with solvents or filtering or any combination of these procedures. Other isolation procedures commonly employed by skilled chemists, e.g., recrystallization procedures for solid crystalline products, can also be used for isolating the products disclosed herein.

Alternatively, my novel silanes of Formula I are also made by an addition reaction of phosphines and phosphinites as described above, having one or two hydrogens bonded to phosphorus with olefinically unsaturated organosilanes having one olefinically unsaturated hydrocarbyl group bonded to silicon. Olefinically unsaturated organosilanes are represented by the formula:

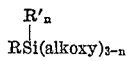

where $n$ and "alkoxy" are as previously defined, $R'$ is as previously defined but is free of aliphatic unsaturation and R is an olefinically unsaturated hydrocarbyl group, e.g., vinyl, allyl, oleyl, cyclohexenyl, styryl, and the like, and include vinylphenyldipropoxysilane, allyltriethoxysilane, oleyldicyclohexylbutoxysilane, cyclohexenyldimethylmethoxysilane, styryltriethoxysilane and the like. The addition is carried out in the presence of a free radical-forming catalyst such as ditertiarybutyl peroxide, dibenzoyl peroxide, dicumyl peroxide, and the like. The reaction temperature is within the range from 50° C. to 180° C. Superatmospheric pressures are not necessary although they can be employed, if desired, and solvents are not particularly necessary. The addition reaction is represented by the equation:

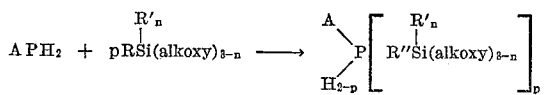

where R, R', R", A, alkoxy, $p$ and $n$ are as previously defined.

Other processes can be employed for making my novel silanes of Formula I. For example, phosphorus compounds of the formula $APH_{2-p}R_p$, where $p$ and R are as defined above and A is as defined above but is free of aliphatic unsaturation are reacted with silanic hydrogen containing organosilanes of the formula:

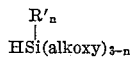

where $R'$ and $n$ are as previously defined. The reaction is carried out in the presence of a ditertiaryalkyl peroxide, e.g., ditertiarybutyl peroxide, and at a temperature in the range from 100° C. to 250° C. Superatmospheric pressures and solvents are not required although they may be desired. The reaction is represented by the equation:

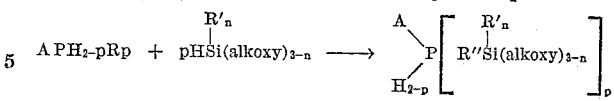

where R, R', R", $n$ and $p$ are as previously defined and A is as previously defined but is free of aliphatic unsaturation.

Similarly, my novel silanes of Formula II are also made by an addition reaction of phosphines, phosphonites and phosphinites, as described above, having one hydrogen bonded to phosphorus with olefinically unsaturated organosilanes having one to two olefinically unsaturated hydrocarbyl groups bonded to silicon. Olefinically unsaturated organosilanes are represented by the formula:

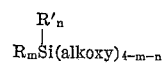

where $R'$ is as previously defined but is free of aliphatic unsaturation and "alkoxy" is as previously defined and R is an olefinically unsaturated hydrocarbyl group, e.g., vinyl, allyl, oleyl, butenyl, cyclohexenyl, styryl, and the like, and include vinylphenyldipropoxysilane, vinyltriethoxysilane, allyltriethoxysilane, oleyl dicyclohexenyl butoxy silane, cyclohexenyldimethylmethoxysilane, styryltriethoxysilane, diallylmethylethoxysilane, divinylmethylethoxysilane, vinylmethyldiethoxysilane, butenyltriethoxysilane, butenylallyldiethoxysilane, and the like. In the above formula $n$ is an integer from 0 to 2, $m$ is an integer from 1 to 2 and $n+m$ is an integer from 1 to 3. The addition is carried out in the presence of a free radical-forming catalyst such as ditertiary butyl peroxide, dibenzoyl peroxide, dicumyl peroxide, dichlorobenzoyl peroxide, and the like. The reaction temperature is with the range from 50° C. to 180° C. Superatmospheric pressures are not necessary although they can be employed, if desired, and solvents are not particularly necessary. The addition reaction is represented by the equation:

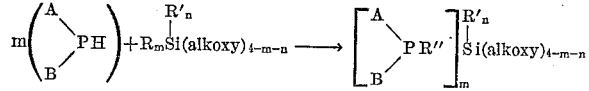

where R, R", A, B, "alkoxy," $m$, $n$ and $m+n$ are as previously defined and $R'$ is as defined above but is free of aliphatic unsaturation.

Other processes can be employed for making my novel organosilicon compounds. For example, phosphorus compounds of the formula

where R is as defined above and A and B are as defined above but are free of aliphatic unsaturation, are reacted with silanic hydrogen containing organosilanes of the formula:

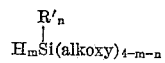

where $R'$ and "alkoxy" are as previously defined. In the formula $n$ is an integer of 0 to 2, $m$ is an integer of 1 to 2 and $n+m$ is an integer equal to 1 to 3. The reaction is carried out in the presence of a ditertiary alkyl peroxide, e.g., ditertiary butylperoxide, and at a temperature in the range from 100° C. to 250° C. Superatmospheric pressures and solvents are not required although they may be desired. The reaction is represented by the equation:

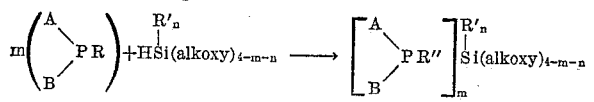

where R, R', R", n, m and m+n are as previously defined and A and B are as previously defined but are free of aliphatic unsaturation.

The novel silanes of this invention are useful as additives to known silicone oils and greases for improving the lubricity of such oils and greases. My novel organo silicon compounds are hydrolyzable and can be hydrolyzed and condensed alone or in admixture with other hydrolyzable organosilanes having at least one hydrolyzable group, e.g., halogen, acyloxy and alkoxy, bonded to silicon and no other groups than hydrocarbyl bonded to silicon. Hydrolysis and condensation techniques known to those skilled in the art of silicon chemistry are employed. The polysiloxanes obtained by hydrolysis and condensation as described above are useful in the form of resins for providing protective coatings to metals, such as iron, steel, aluminum, magnesium, and the like, and in the form of linears and oils as lubricant additives for improving lubricity.

My novel organopolysiloxanes comprise units represented by the formula:

(III) 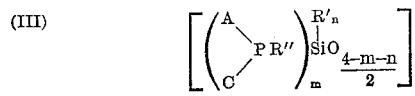

wherein R', R", A, m and n have the meanings defined hereinabove with reference to Formulas I and II, and C is hydrogen or a B group, where B has the meaning defined hereinabove with reference to Formula II.

These novel organopolysiloxanes include those consisting of only units having the above Formula III and those containing units of the above Formula III and, in addition, units represented by the formula:

(IV) 

wherein R' is as above defined and need not be the same throughout the same molecule, and $x$ is an integer from 0 to 3 inclusive and is the same throughout the same unit but need not be the same throughout the same molecule. My novel compositions thus include the disiloxanes, linear oils, gums, cyclic siloxanes, resins and elastomers. My preferred organopolysiloxanes are those in which C, A, R' and R" each contain from one to eighteen carbon atoms.

The polysiloxanes of this invention are conveniently made by a process involving the hydrolysis and condensation of the phosphorus-containing silanes represented by the Formulas I and II above. In order to prepare the novel organopoly-siloxanes having only units represented by Formula III, the phosphorus-containing silanes as shown above are hydrolyzed and condensed. In making the novel organopolysiloxanes containing units represented by Formula III and Formula IV the phosphorus-containing silanes are hydrolyzed and condensed with hydrolyzable silanes represented by the formula:

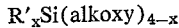

wherein R', $x$ and alkoxy are as defined above. These silanes are illustrated by phenyltriethoxysilane, dimethyldiethoxysilane, trimethylethoxysilane, methyltributoxysilane, tetraethoxysilane, diphenyldiethoxysilane, vinyl(methyl)dimethoxysilane, divinyldiethoxysilane, dicyclohexyldiethoxysilane, and the like.

The process for producing my novel organopolysiloxanes involves reacting water with the phosphorus-containing silane alone or concurrently with the hydrolyzable silanes described above. Basic catalysts such as potassium hydroxide, sodium hydroxide, potassium silanolate and the like or acidic catalysts such as sulfuric acid, hydrochloric acid and the like can be employed in the reaction. The reaction is conducted at room temperature and higher temperatures. At room temperature the hydrolysis of alkoxy groups attached to silicon takes place more readily than, and in preference to, any hydrocarbyloxy groups bonded to phosphorus. Sufficient water for hydrolysis and condensation of the silicon-bonded alkoxy groups is employed although excesses of water over and above that amount required for hydrolysis and condensation is preferred for ease of reaction. Low boiling materials such as water, alkanol by-product, solvents and the like are stripped from the reaction mixture by conventional means. Silicon-bonded alkoxy groups and/or hydroxyl groups can be present in the product by the incomplete hydrolysis and/or condensation of silicon-bonded alkoxy groups. Where the phosphorus-containing silane starting material contains phosphorus-bonded hydrocarbyloxy groups some or all of the said hydrocarbyloxy groups can be hydrolyzed to form hydroxyl groups bonded to phosphorus. The phosphorus-bonded hydroxyl groups can be made to condense with silicon-bonded hydroxyl groups to form silicon to oxygen to phosphorus bonds. Phosphorus-bonded alkali metaloxy groups can also be formed by reaction of phosphorus-bonded hydrocarbyloxy groups with alkali metal bases at high temperatures. The amount of water employed is at least one mole for each mole of silicon-oxy-silicon linkage desired to be produced, i.e., for each two moles of silicon-bonded alkoxy group desired to be hydrolyzed to form a silicon-bonded hydroxyl group which later condense with each other to form the silicon-oxy-silicon linkage. An excess of water over and above this amount is preferred for speed and ease of reactions.

The phosphorus-containing silanes as described above can also be hydrolyzed and condensed with hydrolyzates, containing units represented by Formula IV and containing, in addition, some silicon-bonded hydroxyl groups, to form the novel organopolysiloxanes. Such hydrolyzates are prepared by hydrolyzing hydrolyzable silanes as described above and/or halosilanes having one or more halogens attached to silicon with any remaining valences of silicon being satisfied by hydrocarbyl groups. The hydrolysis and condensation of the phosphorus-containing silanes and the hydrolyzates is conducted in accordance with the process described above or in accordance with any other suitable process.

My novel organopolysiloxanes are also prepared by equilibrating the novel organopolysiloxanes containing units represented by Formula III or containing, in addition, units represented by Formula IV with polysiloxanes composed of units represented by Formula IV in the presence of acidic or basic equilibration catalysts. The novel organopolysiloxanes can also be made to undergo thermal or catalytic rearrangements by techniques known to those skilled in the art for producing special effects and modified properties, e.g., lower volatiles content. Thus, thermal rearrangement in any autoclave has produced novel organopolysiloxanes having lower volatiles content.

The organopolysiloxanes of this invention are useful as lubricants and as additives to known silicone oils and greases for improving lubricity and imparting flame resistance. The linear and resinous organopolysiloxanes described herein form transparent, solvent-resistant coatings when cured on articles, particularly metal articles. When cured as coatings on metal articles these organopolysiloxanes also provide corrosion resistance thereto.

The following examples are presented. In these examples all percentages and parts are based on weight unless otherwise specified. Room temperature as employed herein is a temperature from 20° C. to 25° C. The following symbols wherever employed herein have the following meanings: φ designates phenyl, Me designates methyl, Et designates ethyl and Vi designates vinyl. Refluxing was conducted at atmospheric pressure unless otherwise indicated. Viscosity measurements were made on a Brookfield viscometer using a No. 2 spindle.

The percent volatiles in a material was determined by subjecting a weighed sample (usually about 1 gram) of the material being tested, after heating it for about fifteen minutes at 150° C. to remove solvent, to a temperature of 250° C. for three hours. The percent weight loss, i.e., the percent volatiles, is then calculated as the percent difference between that weight after fifteen minutes at 150° C. and the weight after three hours at 250° C. based on the weight after fifteen minutes at 150° C.

The percent solids of a solution of organopolysiloxane, that is, the amount of the organopolysiloxane in solution, was determined by removing solvent and comparing weights before and after solvent removal. This was accomplished by heating a weighed sample of the solution for about fifteen minutes at 150° C. The material remaining after heating represented the organopolysiloxane, and percent solids is determined from the weight of organopolysiloxane after heating and the initial weight of the solution prior to heating.

*Example 1*

To a one-liter, round-bottomed flask equipped with motor stirrer, addition funnel, and reflux condenser was charged phenylphosphine, $C_6H_5PH_2$, (42.0 grams, 0.38 mole) and toluene (50 milliliters). The stream was placed under nitrogen atmosphere and the mixture brought to 150° C. The addition funnel was charged with a solution of vinyltriethoxysilane (72.5 grams, 0.38 mole) and ditertiarybutyl peroxide (9.2 grams). In a dropwise fashion, with good stirring, the silane mixture was added to the reaction flask over a period of one hour. Heating at 150° C. was continued for three hours after addition. The reaction mixture was chilled to room temperature under nitrogen. The reaction mixture was transferred to a 500-milliliter, single-necked, round-bottomed flask using pressurized nitrogen. The flask was attached to a 10-inch Vigreaux column with distilling head and cold trap and distilled under reduced pressure.

A fraction boiling in the range of 157° C. to 213° C. at 2.5 millimeters Hg pressure, weighing 16.5 grams and having a refractive index, $n_D^{25}$, of 1.4844 was obtained and analyzed. Elemental and infrared analyses confirmed the formula $H(C_6H_5)PC_2H_4Si(OC_2H_5)_3$, (phenylphosphinoethyl)triethoxysilane.

*Example 2*

One mole of $CH_3PHNa$ (70.0 grams) is prepared by adding sodium to methyl phosphine, $CH_3PH_2$, at a temperature below −50° C. under a blanket of nitrogen and is kept in toluene at −50° C. by chilling. To this salt solution which is warmed to −25° C. is added one mole of $Cl(C_6H_4)Si(C_6H_5)(OC_2H_5)_2$ (30.75 grams), diluted with 10 milliliters of "Cellosolve," in a dropwise fashion over thirty minutes. The reaction mixture is stirred for one hour and allowed to warm up slowly to 0° C. and then up to 25° C. to 30° C. or room temperature. It is stirred for one hour at room temperature and then heated at 100° C. for two hours to insure complete reaction. The mixture is allowed to cool to room temperature (25° C. to 30° C.). The white liquid phase is separated from the alkali metal salt NaCl and dried under conditions excluding oxygen or air. The product obtained is

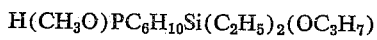

(methylphosphinophenyl)phenyldiethoxysilane.

*Example 3*

One mole of phenyl phosphinite, $(C_6H_5O)PH_2$ is reacted with two moles of sodium to form disodium phenyl phosphinite, $(C_6H_5O)PNa_2$, in a manner similar to that described in Example 2. To one mole of the disodium phenyl phosphinite is added two moles of gamma-chloropropyl(methyl)dimethoxysilane in a dropwise fashion over a period of about 50 minutes while maintaining a temperature of about −25° C. The reaction mixture is allowed to warm to room temperature and stirred at room temperature for about one hour. It is then heated at about 100° C. for about three hours to insure complete reaction. After cooling to room temperature, the liquid phase is separated from sodium chloride and dried in the absence of oxygen or air. The product obtained is phenyl bis(dimethoxymethylsilylpropyl)phosphinite, $C_6H_5OP[C_3H_6Si(CH_3)(OCH_3)_2]_2$.

*Example 4*

Sodium methyl phosphinite, $CH_3OPHNa$, is prepared by adding sodium to methyl phosphinite in a manner similar to that described in Example 2. One mole of the sodium methyl phosphinite is reacted with chlorocyclohexyl(diethyl)propoxysilane in a manner similar to that described in Example 2 to form (methoxyphosphinocyclohexyl)(diethyl)propoxysilane, $$H(CH_3O)PC_6H_{10}Si(C_2H_5)_2(OC_3H_7)$$

*Example 5*

To a 500-milliliter, round-bottomed, three-necked flask equipped with motor stirrer, addition funnel and reflux condenser was charged phenylphosphine, $C_6H_5PH_2$ (43 grams, 0.39 mole), and the system placed under a nitrogen atmosphere. The phosphine was chilled to −40° C. and sodium (9.0 grams, 0.39 mole) was added through the addition funnel in the form of a dispersion (40 percent sodium by weight in toluene) in a dropwise fashion over a period of twenty minutes. The reaction mixture was allowed to warm to 0° C. and dimethyl "Cellosolve" (10 milliliters) added, whereupon a vigorous reaction ensued. The reaction mixture was chilled once again to −40° C. and stirred over one hour. Sodium phenyl phosphine, $C_6H_5PHNa$, was thus formed. The addition funnel was charged with ethyl bromide (42.5 grams, 0.39 mole) and the reagent added dropwise at −40° C. over twenty minutes. Reaction was exothermic. A yellow-green phosphinite color was observed. This changed to a water-white phosphine color when mixture was allowed to warm up to 0° C. over one hour. Phenylethylphosphine, $C_6H_5(C_2H_5)PH$, formed. Sodium dispersion (9.0 grams sodium, 40 percent by weight in toluene) and dimethyl "Cellosolve" (100 milliliters) were charged to an addition funnel and the reaction mixture chilled to −40° C. Addition to reaction mixture was completed in twenty minutes and sodium phenylethylphosphine, $C_6H_5(C_2H_5)PNa$, was formed. Stirring was continued for one hour after addition was completed and then the reaction mixture was allowed to warm up to 25° C. The addition funnel was charged with gamma-chloropropyltriethoxysilane (99 grams, 0.41 mole) and the reaction mixture chilled to 0° C. Addition was conducted in dropwise fashion over twenty minutes. The reaction mixture was stirred for one hour after addition was complete and the mixture allowed to warm up to 25° C. It was then heated to 100° C over one and one-half hours to effect complete reaction. The mixture was allowed to return to room temperature (25° C.).

The water-white liquid phase which had formed was decanted through glass wool to remove colloidal salts. The product was dried by distillation and 155 grams of crude material obtained. The cured product was then distilled in vacuo through a 25-inch insulated Vigreaux column. A light yellow liquid fraction weighing 32.5 grams and having an index of refraction, $n_D^{25}$, of 1.4840 was obtained and analyzed. This fraction had a boiling point of 129° C. to 132° C. at 0.55 mm. Hg pressure. The formula, $C_6H_5(C_2H_5)PC_3H_6Si(OC_2H_5)_3$, was confirmed for the fraction by infrared analysis, elemental analysis and comparison of calculated and measured molar refractions. Yield of product was 32 mole percent.

*Example 6*

To a 200 cc. flask equipped with water reflux condenser, mechanical stirrer, thermometer and dropping funnel was added phenylbutylphosphine (0.113 mole, 18.8 grams). The phosphine was heated to 120° C., then to it was added dropwise a mixed solution of vinyltriethoxysilane (0.113 mole, 21.5 grams) and ditertiary butyl peroxide (2.8 grams). During the addition (one hour), the temperature was maintained at 120° C. to 150° C. Finally the reaction mixture was heated for two hours at 150° C. to 162° C. The reaction product was then fractionated through "Heli-Pak" in a 12 inch x ¾ inch column. Fraction No. 2 (11.8 grams) and fraction No. 3 (9.4 grams) appeared to be of the same composition based on essentially identical indices of refraction (1.4911 and 1.4913, respectively). These two fractions represented a 53 percent yield of product. Elemental analysis confirmed the formula of the product to be $(C_6H_5)(C_4H_9)PC_2H_4Si(OC_2H_5)_3$.

*Example 7*

To a 500 cc. flask equipped with mechanical stirrer, dropping funnel, thermometer and reflux condenser was added diphenylphosphine (0.08 mole, 15.5 grams). A solution of vinylmethyldiethoxysilane (0.083 mole, 13.3 grams) and ditertiarybutyl peroxide (2.0 grams) was added dropwise while maintaining the reaction mixture at 140° C. to 156° C. Finally, the mixture was heated to 174° C. (forty-five minutes) and then cooled. It was fractionated through "Heli-Pak" in a 12 inch x ¾ inch column. Fraction 3 weighed 6.7 grams, boiling point 166° C. to 139° C./0.065–0.06 millimeters Hg, $n_D^{25}=1.5510$. Fraction 4 weighed 5.9 grams, boiling point 137° C. to 151° C./0.05 millimeter Hg, $n_D^{25}=1.5496$. These two fractions represent a 44 percent yield of the desired product. Analysis of the product confirmed the formula $$(C_6H_5)_2PC_2H_4Si(CH_3)(OC_2H_5)_2$$

*Example 8*

To a 300 cc. steel pressure vessel was added phenylethylallylphosphine, $$C_6H_5(C_2H_5)PCH_2CH=CH_2$$

(0.157 mole, 28.0 grams), triethoxysilane, $$HSi(OC_2H_5)_3$$

(0.157 mole, 25.8 grams) and ditertiary butyl peroxide (3.8 grams). The sealed vessel was heated slowly while rocking to 195° C. over a period of one and three-fourths hours. The temperature was maintained at 190° C. for forty minutes. The reaction products were fractionated through "Heli-Pak" in a 12 inch x ¾ inch column. A fraction weighing 2.1 grams, boiling in the range of 90° C. to 120° C. at 0.2 to 0.3 millimeters Hg pressure was obtained and analyzed. The formula of (phenylethylphosphinopropyl)triethoxysilane, $$C_6H_5(C_2H_5)PC_3H_6Si(OC_2H_5)_3$$

was confirmed by analysis.

*Example 9*

Sodium methyl phenylphosphinite, $$(CH_3O)(C_6H_5PNa)$$

is prepared by reacting methyl phenylphosphinite, $$(CH_3O)(C_6H_5)PH$$

with sodium in a manner similar to that set forth in Example 1. The sodium methyl phenylphosphinite is then reacted with chlorophenyl(ethyl)dimethoxysilane employing procedures similar to those prescribed in Example 1 to form (methoxyphenylphosphinophenyl) (ethyl)dimethoxysilane, $$(CH_3O)(C_6H_5)PC_6H_4Si(C_2H_5)(OCH_3)_2$$

*Example 10*

Sodium diphenyl phosphinite is prepared from sodium and diphenyl phosphinite and reacted with chlorocyclohexyl(diphenyl)propoxysilane employing procedures similar to those used in Example 1. The product thus formed is (diphenoxyphosphinocyclohexyl)(diphenyl) propoxysilane, $(C_6H_5O)_2PC_6H_{10}Si(C_6H_5)_2(OC_3H_7)$.

*Example 11*

Stearylphosphine, $C_{18}H_{37}PH_2$, is prepared by reacting white phosphorus, $P_4$, aqueous sodium hydroxide, $$6NaOH$$

and stearyl iodide, $2C_{18}H_{37}I$, in an autoclave at 150° C. to 200° C. for several hours. Stearylphosphine is produced in about 30 per cent yield along with NaI and $NaHPO_3$.

One mole of the stearylphosphine thus obtained is diluted in xylene and cooled to 0° C. and one mole of sodium is added. The mixture is slowly brought up to room temperature, placed under a blanket of $N_2$, then heated to 120° C. for one hour, and then cooled to 0° C. To this mixture now containing sodium stearylphosphine, $C_{18}H_{37}PHNa$, is added one mole of methyl chloride and the mixture allowed to warm to room temperature. The autoclave is heated at 110° C. for several hours to give methylstearylphosphine and a slurry of NaCl. The mixture is cooled to 0° C. and another mole of sodium is added. The mixture is allowed to come to room temperature and then heated at 112° C. for one hour thereby producing sodium methylstearylphosphine, $(CH_3)(C_{18}H_{37})PNa$. To this mixture after cooling to 10° C. is added one mole of p-chlorophenyltriethoxysilane and the mixture is heated at 130° C. for several hours. A slurry of NaCl forms and the resultant product, (methylstearylphosphinophenyl)triethoxysilane, $(CH_3)(C_{18}H_{37})PC_6H_4Si(OC_2H_5)_3$, is obtained in about 30 percent yield.

*Examples 12 Through 15*

Four siloxane hydrolyzates were prepared employing the respective amounts of the isopropyl ether, water and indicated chlorosilanes shown in each of the four tabulations below. In each preparation the isopropyl ether and water mixture was charged to a kettle and the mixture of chlorosilanes was added dropwise thereto while stirring and maintaining a kettle temperature below about 40° C. After about 50 percent of the chlorosilane mixture had been added, the water phase formed in the kettle was drained and replaced with an equal volume of fresh water. Addition of the chlorosilane mixture was resumed and after it was completed the formed water phase was again drained from the kettle. The resulting siloxane hydrolyzate was washed about three times with water until neutral. The hydrolyzate was then stripped of volatile materials to a kettle temperature of 135° C. while sparging with nitrogen. The hydrolyzate was cooled, dissolved in about 50 weight percent toluene and washed with water until it became neutral, water being azeotroped out of the system following each wash step. The hydrolyzate formed in each example had an R'/Si and phenyl-to-methyl ratio as indicated in each of the respective tabulations below:

*Example 12*

Chlorosilane Mixture:
  φMeSiCl$_2$ _____ 573 g., 50 mole-percent
  Me$_2$SiCl$_2$ _____ 387 g., 50 mole-percent
  Isopropyl Ether _____ 1800 cc.
  Water _____ 1050 g.

R'/Si=2.0; φ/Me=0.33.

*Example 13*

Chlorosilane Mixture:
  Me$_2$SiCl$_2$ _____ 687.6 g., 66.7 mole-percent
  φSiCl$_3$ _____ 564.7 g., 33.3 mole-percent
  Isopropyl Ether _____ 2240 cc.
  Water _____ 1400 cc.

R'/Si=1.67; φ/Me=0.27.

Example 14

Chlorosilane Mixture:
- φMeSiCl$_2$ —— 382 g., 50 mole-percent
- φSiCl$_3$ —— 169.2 g., 20 mole-percent
- Me$_2$SiCl$_2$ —— 103.2 g., 20 mole-percent
- MeSiCl$_3$ —— 59.8 g., 10 mole-percent
- Isopropyl Ether —— 1200 cc.
- Water —— 700 cc.

R′/Si=1.70; φ/Me=0.70

Example 15

Chlorosilane Mixture:
- φMeSiCl$_2$ —— 114.6 g., 15 mole-percent
- φSiCl$_3$ —— 338.4 g., 40 mole-percent
- Me$_2$SiCl$_2$ —— 92.9 g., 18 mole-percent
- MeSiCl$_3$ —— 161.5 g., 27 mole-percent
- Isopropyl Ether —— 1200 cc.
- Water —— 700 cc.

R′/Si=1.33; φ/Me=0.71.

Example 16

A mixture was prepared from 7.87 grams (0.02 mole) of (diphenylphosphinoethyl) methyldiethoxysilane $$\phi_2PC_2H_4Si(Me)(OEt)_2$$

8.73 grams (0.06 mole) of the hydrolyzate prepared in Example 15 (as a 71 percent solution in toluene), 12.0 grams of toluene, 2.0 grams of water and 0.13 gram of 25 percent aqueous sodium hydroxide. The mixture was refluxed with stirring at a kettle temperature of 95° C. for three hours. After this time the resulting mixture was cooled, acidified with concentrated HCl and neutralized with propylene oxide. The neutralized mixture was then stripped of low boiling materials to a kettle temperature of 110° C. There resulted a 40 percent solution in toluene of the organopolysiloxane represented by the formula:

$$\left[\phi_2PC_2H_4\overset{Me}{\underset{|}{Si}}O\right][\phi(Me)SiO][\phi SiO_{3/2}][Me_2SiO][MeSiO_{3/2}]$$

This organopolysiloxane had a percent volatiles of 36 percent. The 40 percent solution was placed in an autoclave and maintained at 250° C. for three hours to thermally rearrange the organopolysiloxane contained thereby. The percent volatiles of the rearranged organopolysiloxane was 13 percent.

Example 17

A mixture was prepared from 78 grams (0.022 mole) of (butylphenylphosphinoethyl)triethoxysilane, 9.4 grams (0.067 mole) of the hydrolyzate prepared in Example 13 (as a 65.5 percent solution in toluene), 15.3 grams of toluene, 1.0 gram of water and 0.2 gram of a 25 percent aqueous solution of potassium hydroxide. The mixture was refluxed with stirring at a kettle temperature of 85° C. for three hours. The resulting mixture was cooled, acidified with concentrated HCl and neutralized with propylene oxide. The neutralized mixture was stripped of low-boiling materials to a kettle temperature of 110° C. There resulted a 35 percent solution in toluene of the organopolysiloxane represented by the formula:

$$[(C_4H_9)(\phi)PC_2H_4SiO_{3/2}][Me_2SiO][\phi SiO_{3/2}]$$

Example 18

The organopolysiloxane represented by the formula:

$$[H(C_6H_5)PC_2H_4SiO_{3/2}][\phi(Me)SiO][Me_2SiO]$$

is prepared by reacting the hydrolyzate of Example 12 with (phenylphosphinoethyl)triethoxysilane in a manner similar to that described in Examples 16 and 17.

Example 19

The organopolysiloxane represented by the formula:

$$\left[H(CH_3)PC_6H_4\overset{\phi}{\underset{|}{Si}}O\right][\phi(Me)SiO][\phi SiO_{3/2}][Me_2SiO][MeSiO_{3/2}]$$

is prepared by reacting the hydrolyzate of Example 14 with (methylphosphinophenyl)phenyldiethoxysilane in a manner similar to that described in Examples 16 and 17.

Example 20

The organopolysiloxane represented by the formula:

$$[(C_6H_5)(C_2H_5)PC_3H_6SiO_{3/2}]$$

is made by hydrolyzing and condensing (phenylethylphosphinopropyl)triethoxysilane in accordance with the methods described and illustrated herein.

Example 21

The organopolysiloxane represented by the formula:

$$[(C_6H_5)(C_4H_9)PC_2H_4SiO_{3/2}][(Vi)(Me)SiO]$$

is made by cohydrolyzing and cocondensing (phenylbutylphosphinoethyl)triethoxysilane and vinylmethyldiethoxysilane in accordance with the methods described and illustrated herein.

Example 22

The organopolysiloxane represented by the formula:

$$[\phi_2PC_2H_4Si(CH_3)O][(Vi)(Me)SiO]$$

is prepared by cohydrolyzing and cocondensing (diphenylphosphinoethyl)methyldiethoxysilane and vinylmethyldiethoxysilane, in accordance with the methods described and illustrated herein.

Employing the methods described and illustrated herein the following organopolysiloxanes are made:

$$\left[(CH_3O)_2P(CH_2)_3\overset{\phi}{\underset{|}{Si}}O\right][\phi_2SiO][MeSiO_{3/2}]$$

$$[(\phi O)_2P(CH_2)_3SiO_{3/2}][Et_2SiO][\phi SiO_{3/2}]$$

$$[H(\phi O)PC_3H_6SiO_{3/2}][Vi_2SiO][(Me)(\phi)SiO]$$

$$\left[(C_{18}H_{37}O)(\phi)P(CH_2)_3\overset{Me}{\underset{|}{Si}}O\right][Me_2SiO]$$

$$\left[(C_{18}H_{37})(\phi)P(CH_2)_3\overset{Me}{\underset{|}{Si}}O\right][(Me)(\phi)SiO]$$

$$[(Et)_2PC_6H_4SiO_{3/2}][(Me)(\phi)SiO][\phi SiO_{3/2}]$$

What is claimed is:

1. As new compositions of matter, organosilanes of the formula:

$$\underset{H_{2-p}}{\overset{A}{\diagdown}}P\left[R''\overset{R'_n}{\underset{|}{Si}}(alkoxy)_{3-n}\right]_p$$

wherein R′ is a hydrocarbyl group and need not be the same throughout the same molecule, R″ is a divalent hydrocarbon group free of aliphatic unsaturation, A is a member selected from the class consisting of hydrocarbyl groups and hydrocarbyloxy groups, n is an integer from 0 to 2 and p is an integer from 1 to 2.

2. As new compositions of matter, organosilanes of the formula:

$$\underset{H}{\overset{R'}{\diagdown}}PR''\overset{R'_n}{\underset{|}{Si}}(alkoxy)_{3-n}$$

wherein R′ is a hydrocarbyl group and need not be the same throughout the same molecule, R″ is a divalent hydrocarbon group free of aliphatic unsaturation, and n is an integer from 0 to 2.

3. As new compositions of matter, organosilanes of the formula:

$$R'P\left[R''\overset{R'_n}{\underset{|}{Si}}(alkoxy)_{3-n}\right]_2$$

wherein R' is a hydrocarbyl group and need not be the same throughout the same molecule, R" is a divalent hydrocarbon group free of aliphatic unsaturation, and $n$ is an integer from 0 to 2.

4. As new compositions of matter, organosilanes of the formula:

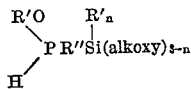

wherein R' is a hydrocarbyl group and need not be the same throughout the same molecule, R" is a divalent hydrocarbon group free of aliphatic unsaturation, and $n$ is an integer from 0 to 2.

5. As new compositions of matter, organosilanes of the formula:

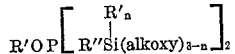

wherein R' is a hydrocarbyl group and need not be the same throughout the same molecule, R" is a divalent hydrocarbon group free of aliphatic unsaturation, and $n$ is an integer from 0 to 2.

6. As a new composition of matter, an organosilane of the formula:

$$H(C_6H_5)PC_2H_4Si(OC_2H_5)_3$$

7. As a new composition of matter, an organosilane of the formula:

8. As a new composition of matter, an organosilane of the formula:

$$C_6H_5OP[C_3H_6Si(CH_3)(OCH_3)_2]_2$$

9. As a new composition of matter, an organosilane of the formula:

$$H(CH_3O)PC_6H_{10}Si(C_2H_5)_2(OC_3H_7)$$

10. As new compositions of matter, organosilanes of the formula:

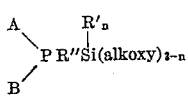

wherein R' is a hydrocarbyl group and need not be the same throughout the same molecule, R" is a divalent hydrocarbon group free of aliphatic unsaturation, A is a member selected from the class consisting of ethyl, butyl, cyclohexyl, and phenyl groups, B is a phenyl group, and $n$ is an integer from 0 to 1.

11. As a new composition of matter, an organosilane of the formula:

$$C_6H_5(C_4H_9)PC_2H_4Si(OC_2H_5)_3$$

12. As a new composition of matter, an organosilane of the formula:

$$(C_6H_5)_2PC_2H_4Si(CH_3)(OC_2H_5)_2$$

13. As a new composition of matter, an organosilane of the formula:

$$C_6H_5(C_2H_5)PC_3H_6Si(OC_2H_5)_3$$

14. As new compositions of matter, organopolysiloxanes comprising comprising units represented by the formula:

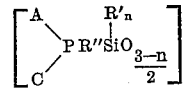

wherein A is a member selected from the class consisting of ethyl, butyl, cyclohexyl, and phenyl groups, C is a member selected from the class consisting of hydrogen and phenyl groups, R' is a hydrocarbyl group, R" is a divalent hydrocarbon group free of aliphatic unsaturation, A, C, R' and R" need not be the same throughout the same molecule, and $n$ is an integer from 0 to 1 and is the same throughout the same unit but need not be the same throughout the same molecule.

15. As new compositions of matter, organopolysiloxanes comprising units represented by the formula:

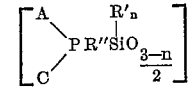

and units represented by the formula:

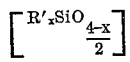

wherein A is a member selected from the class consisting of ethyl, butyl, cyclohexyl, and phenyl groups, C is a member selected from the class consisting of hydrogen and phenyl groups, R' is a hydrocarbyl group, R" is a divalent hydrocarbon group free of aliphatic unsaturation, A, C, R' and R" need not be the same throughout the same molecule, $n$ is an integer from 0 to 1, $x$ is an integer from 0 to 2, and $n$ and $x$ are each individually the same throughout the same unit but need not be the same throughout the same molecule.

16. As a novel composition of matter, the organopolysiloxane represented by the formula:

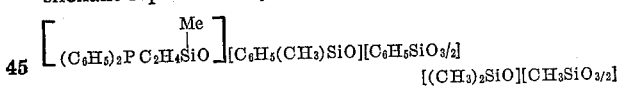

17. As a novel composition of matter, the organopolysiloxane represented by the formula:

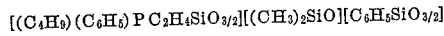

References Cited in the file of this patent

UNITED STATES PATENTS

| 2,835,690 | Prober | May 20, 1958 |
| 2,964,550 | Seyferth | Dec. 13, 1960 |

FOREIGN PATENTS

| 1,118,495 | France | Mar. 19, 1956 |